United States Patent
Shiro et al.

(10) Patent No.: US 12,103,855 B2
(45) Date of Patent: Oct. 1, 2024

(54) SURFACE-MODIFIED NANODIAMOND, LIQUID DISPERSION CONTAINING SURFACE-MODIFIED NANODIAMOND, AND COMPOSITE MATERIAL

(71) Applicant: DAICEL CORPORATION, Osaka (JP)

(72) Inventors: Daisuke Shiro, Tokyo (JP); Atsushi Kume, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 798 days.

(21) Appl. No.: 17/264,591

(22) PCT Filed: Jul. 16, 2019

(86) PCT No.: PCT/JP2019/027946
§ 371 (c)(1),
(2) Date: Jan. 29, 2021

(87) PCT Pub. No.: WO2020/026790
PCT Pub. Date: Feb. 6, 2020

(65) Prior Publication Data
US 2021/0331928 A1    Oct. 28, 2021

(30) Foreign Application Priority Data
Jul. 30, 2018  (JP) ................. 2018-142360

(51) Int. Cl.
| | |
|---|---|
| *C01B 32/28* | (2017.01) |
| *B82Y 30/00* | (2011.01) |
| *B82Y 40/00* | (2011.01) |
| *C08K 3/04* | (2006.01) |

(52) U.S. Cl.
CPC ............. *C01B 32/28* (2017.08); *B82Y 30/00* (2013.01); *B82Y 40/00* (2013.01); *C01P 2004/30* (2013.01); *C01P 2004/62* (2013.01); *C01P 2004/64* (2013.01); *C08K 3/04* (2013.01)

(58) Field of Classification Search
CPC ......... C01B 32/28; C01B 32/25; C01B 32/26; B82Y 30/00; B82Y 40/00; C01P 2004/30; C01P 2004/62; C01P 2004/64; C01P 2006/37; C08K 3/04; C08K 3/013; C08K 3/00
See application file for complete search history.

(56) References Cited

U.S. PATENT DOCUMENTS

| | | | |
|---|---|---|---|
| 2013/0149447 A1* | 6/2013 | Mazyar ............... | C01B 32/05 977/734 |
| 2017/0057828 A1 | 3/2017 | Song et al. | |
| 2018/0223208 A1* | 8/2018 | Sumant .............. | C10M 111/02 |

FOREIGN PATENT DOCUMENTS

| | | |
|---|---|---|
| JP | 2017-8248 A | 1/2017 |
| JP | 2017-128482 A | 7/2017 |
| JP | 2017-202940 A | 11/2017 |
| JP | 2018-30741 A | 3/2018 |

OTHER PUBLICATIONS

Extended European Search Report for European Application No. 19844608.0, dated Mar. 25, 2022.
International Preliminary Report on Patentability and Written Opinion of the International Searching Authority for International Application No. PCT/JP2019/027946, dated Sep. 3, 2019, with an English translation.
International Search Report for International Application No. PCT/JP2019/027946, dated Sep. 3, 2019, with English translation.
Japanese Office Action for Japanese Application No. 2020-533399, dated Oct. 17, 2023.

* cited by examiner

*Primary Examiner* — Stuart L Hendrickson
(74) *Attorney, Agent, or Firm* — Birch, Stewart, Kolasch & Birch, LLP

(57) ABSTRACT

Provided is a surface-modified nanodiamond that has high dispersibility in an organic solvent or in a resin and that can maintain the characteristics described above even in a high-temperature environment of 200° C. or higher. The surface-modified nanodiamond according to an embodiment of the present invention has a structure in which a surface of a nanodiamond particle is modified by a group represented by Formula (1) below. In the formula, $R^1$ to $R^4$ are the same or different and each represent an aliphatic hydrocarbon group having from 1 to 25 carbons. Note that at least one of $R^1$ to $R^4$ is an aliphatic hydrocarbon group having from 10 to 25 carbons. Furthermore, an atomic bond of the carbon atom in the formula bonds to the surface of the nanodiamond particle.

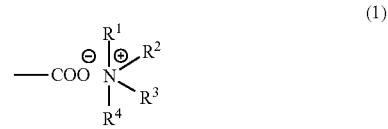

(1)

19 Claims, 3 Drawing Sheets

SURFACE-MODIFIED NANODIAMOND, LIQUID DISPERSION CONTAINING SURFACE-MODIFIED NANODIAMOND, AND COMPOSITE MATERIAL

TECHNICAL FIELD

The present invention relates to a surface-modified nanodiamond, a liquid dispersion containing the surface-modified nanodiamond, and a composite material containing the surface-modified nanodiamond. The present application claims priority to the Japanese Patent Application No. 2018-142360 filed in Japan on Jul. 30, 2018, the content of which is incorporated herein.

BACKGROUND ART

Nanodiamonds can exhibit high mechanical strength, high refractive index, and high thermal conductivity, for example. Thus, such characteristics are imparted to a resin by blending nanodiamonds into the resin.

However, a proportion of surface atoms is typically large in case of a nanodiamond particle (i.e. a nanosized diamond particle). Therefore, a sum of van der Waals forces that can interact between surface atoms of adjacent particles is large, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it was extremely difficult to disperse nanodiamond particles to a state of primary particles in a resin. Therefore, the surface of nanodiamond particles are modified to thereby suppress aggregation of the nanodiamond particles and impart dispersibility.

Patent Document 1 describes blending a nanodiamond to a fluororesin that is liquid at room temperature. The surface of the nanodiamond is modified by a group containing a fluorine atom, and such a nanodiamond is produced by reacting a nanodiamond and a fluorinated alkylcarboxylic acid.

CITATION LIST

Patent Document

Patent Document 1: JP 2017-008248 A

SUMMARY OF INVENTION

Technical Problem

Meanwhile, to highly disperse nanodiamond particles in a resin material that is solid at room temperature, nanodiamond particles need to be added and kneaded in a state in which the resin material is melted; however, the nanodiamond, the surface of which is modified by a fluorinated alkylcarboxylic acid, loses dispersibility at a temperature of approximately 155° C. due to thermal decomposition of the surface modification group and release of the surface modification group from the nanodiamond surface. Thus, it has been extremely difficult to highly disperse a nanodiamond in a resin material having a melt-kneading temperature of 200° C. or higher (e.g. engineering plastic).

Therefore, an object of the present invention is to provide a surface-modified nanodiamond that has high dispersibility in an organic solvent or in a resin and that can maintain the characteristics described above even in a high-temperature environment of 200° C. or higher.

Another object of the present invention is to provide a nanodiamond liquid dispersion in which the surface-modified nanodiamonds are highly dispersed in an organic solvent.

Another object of the present invention is to provide a composite material in which the surface-modified nanodiamonds are highly dispersed in a resin.

Solution to Problem

As a result of diligent research to solve the problems described above, the present inventors found the following.

1. In a nanodiamond surface-modified by an ammonium salt modification group, which is formed by reacting a nanodiamond particle and a quaternary ammonium compound, the ammonium salt modification group has an affinity toward the organic solvent or the resin, and aggregation is suppressed by steric hindrance of the ammonium salt modification group. And thus, the nanodiamond exhibits high dispersibility in an organic solvent or a resin.

2. The ammonium salt modification group can maintain bonding to a nanodiamond particle surface without undergoing decomposition even in a high-temperature environment of 200° C. or higher (that is, heat resistance is excellent), and maintain aggregation resistance.

The present invention was completed based on these findings.

That is, an embodiment of the present invention provides a surface-modified nanodiamond having a structure in which a surface of a nanodiamond particle is modified by a group represented by Formula (1) below.

[Chem. 1]

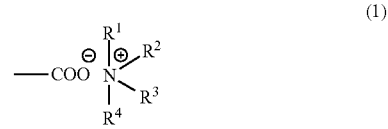

In the formula, $R^1$ to $R^4$ are the same or different and each represent an aliphatic hydrocarbon group having from 1 to 25 carbons. Note that at least one of $R^1$ to $R^4$ is an aliphatic hydrocarbon group having from 10 to 25 carbons. Furthermore, an atomic bond of the carbon atom in the formula bonds to the surface of the nanodiamond particle.

An embodiment of the present invention also provides the surface-modified nanodiamond having a thermal decomposition starting temperature of 250° C. or higher.

An embodiment of the present invention also provides a nanodiamond liquid dispersion containing an organic solvent and the surface-modified nanodiamond described above, the nanodiamond liquid dispersion including the surface-modified nanodiamond in a proportion of 0.0001 to 10 parts by mass per 100 parts by mass of the organic solvent.

An embodiment of the present invention also provides a composite material having a resin and the surface-modified nanodiamond.

An embodiment of the present invention also provides a composite material which is a molten mixture of a resin and the surface-modified nanodiamond.

An embodiment of the present invention also provides the composite material, in which the resin is a thermoplastic resin having a glass transition temperature or a melting point of 150° C. or higher.

Advantageous Effects of Invention

Because the surface-modified nanodiamond according to an embodiment of the present invention contains the ammonium salt modification group that has excellent affinity toward an organic solvent or a resin and that has excellent heat resistance on its surface, the surface-modified nanodiamond can maintain aggregation resistance even in a high-temperature environment of 200° C. or higher as well as in a temperature environment of lower than 200° C., and exhibit excellent dispersibility in an organic solvent or in a resin. Therefore, the surface-modified nanodiamond according to an embodiment of the present invention can be melted and mixed in a thermoplastic resin having a high molding temperature (or melting temperature) without losing the dispersibility or the aggregation resistance, and can impart the characteristics of the nanodiamond (e.g. high mechanical strength, high refractive index, and high thermal conductivity) to the resin while retaining transparency of the resin in the case where the resin is transparent.

Furthermore, a nanodiamond liquid dispersion formed by dispersing the surface-modified nanodiamonds according to an embodiment of the present invention in an organic solvent can be suitably used as, for example, an imparting agent to impart the characteristics of the nanodiamond (e.g. high mechanical strength, high refractive index, and high thermal conductivity) to a resin. Furthermore, because the liquid dispersion has an effect of reducing coefficient of friction (lubricating action), the nanodiamond liquid dispersion can be suitably used as an antifriction agent or a lubricant applied to, for example, a sliding member of a machine component (e.g. in automobiles and aircrafts).

Furthermore, because the composite material according to an embodiment of the present invention contains the surface-modified nanodiamonds in a resin in a highly dispersed manner, the composite material highly exhibits the characteristics of the nanodiamond. Thus, the composite material according to an embodiment of the present invention can be suitably used as a formation material for various articles that are produced by melt molding and that are desired to have the characteristics of the nanodiamond.

DESCRIPTION OF EMBODIMENTS

Surface-Modified Nanodiamond

The surface-modified nanodiamond according to an embodiment of the present invention (hereinafter, nanodiamond may be also referred to as "ND") has a structure in which a surface of a nanodiamond particle is modified by a group represented by Formula (1) below (i.e. ammonium salt modification group).

[Chem. 2]

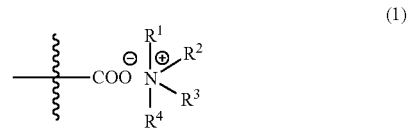

In the formula, $R^1$ to $R^4$ are the same or different and each represent an aliphatic hydrocarbon group having from 1 to 25 carbons. Note that at least one of $R^1$ to $R^4$ is an aliphatic hydrocarbon group having from 10 to 25 carbons. Furthermore, an atomic bond (i.e. atomic bond indicated by a wavy line) of the carbon atom in the formula bonds to the surface of the nanodiamond particle.

Figure 1:
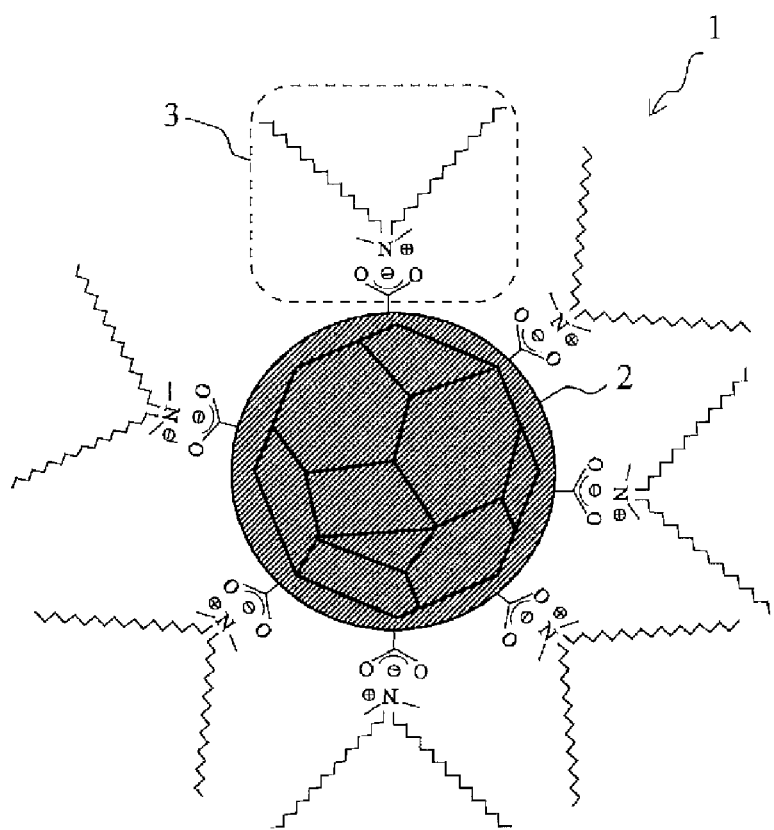
FIG. 1 is an enlarged schematic view illustrating an example of the surface-modified nanodiamond according to an embodiment of the present invention.

FIG. 1 is an enlarged schematic view illustrating an example of a surface-modified ND according to an embodiment of the present invention, wherein the surface-modified ND [1] has an ammonium salt modification group [3] on a surface of an ND particle [2].

$R^1$ to $R^4$ are the same or different and each represent an aliphatic hydrocarbon group having from 1 to 25 carbons. Furthermore, at least one of $R^1$ to $R^4$ is an aliphatic hydrocarbon group having from 10 to 25 carbons.

For $R^1$ to $R^4$, among these, from the viewpoint of achieving excellent dispersibility and heat resistance, preferably, two or three groups selected from $R^1$ to $R^4$ are each an aliphatic hydrocarbon group having from 10 to 25 carbons and the other group(s) are each an aliphatic hydrocarbon group having from 1 to 9 carbons. Particularly preferably, two groups selected from $R^1$ to $R^4$ are each an aliphatic hydrocarbon group having from 10 to 25 carbons and the other two groups are each an aliphatic hydrocarbon group having from 1 to 9 carbons.

Furthermore, one group selected from $R^1$ to $R^4$ (e.g. $R^1$) may be an aliphatic hydrocarbon group having from 10 to 25 carbons, and the other groups (e.g. $R^2$, $R^3$, and $R^4$) may be each an aliphatic hydrocarbon group having from 1 to 9 carbons.

Examples of the aliphatic hydrocarbon group having from 1 to 9 carbons include linear or branched alkyl groups, such as methyl, ethyl, propyl, isopropyl, butyl, isobutyl, s-butyl, t-butyl, pentyl, hexyl, and octyl groups; linear or branched alkenyl groups having from 2 to 9 carbons, such as a vinyl group, an allyl group, and a 1-butenyl group; and linear or branched alkynyl groups having from 2 to 9 carbons, such as an ethynyl group and a propynyl group. In an embodiment of the present invention, among these, an aliphatic hydrocarbon group having from 1 to 5 carbons is preferred, and an aliphatic hydrocarbon group having from 1 to 3 carbons is particularly preferred. Furthermore, among these, the aliphatic hydrocarbon group is preferably a linear or branched alkyl group or alkenyl group, and is particularly preferably a linear or branched alkyl group.

Examples of the aliphatic hydrocarbon group having from 10 to 25 carbons include linear or branched alkyl groups, such as decyl, lauryl, butyloctyl, myristyl, isomyristyl, isocetyl, hexyldecyl, stearyl, isostearyl, octyldecyl, octyldodecyl, nonadecyl, and behenyl groups; linear or branched alkenyl groups, such as 9-decenyl, 11-dodecenyl, and oleyl groups; and linear or branched alkynyl groups, such as decynyl, pentadecynyl, and octadecynyl groups. In an embodiment of the present invention, among these, an aliphatic hydrocarbon group having from 15 to 25 carbons is preferred, and an aliphatic hydrocarbon group having from 15 to 20 carbons is particularly preferred. Furthermore, among these, the aliphatic hydrocarbon group is preferably a linear or branched alkyl group or alkenyl group, and is particularly preferably a linear or branched alkyl group.

In the case where two groups selected from $R^1$ to $R^4$ are each an aliphatic hydrocarbon group having from 10 to 25 carbons, for example, when $R^1$ and $R^2$ are each an aliphatic hydrocarbon group having from 10 to 25 carbons and $R^3$ and $R^4$ are each an aliphatic hydrocarbon group having from 1 to 9 carbons, the sum of the number of carbons of $R^1$ and $R^2$ is, for example, from 20 to 50, preferably from 25 to 45, and particularly preferably from 30 to 40. Furthermore, the sum of the number of carbons of $R^3$ and $R^4$ is, for example, from 2 to 10, preferably from 2 to 5, and particularly preferably from 2 to 4.

Furthermore, the sum of the number of carbons of $R^1$, $R^2$, $R^3$, and $R^4$ is, for example, from 22 to 60, preferably from 25 to 50, and particularly preferably from 30 to 45.

The ND particle constituting the surface-modified ND preferably contains a primary particle of the nanodiamond. In addition, a secondary particle in which a few to dozens of the primary particles aggregate may be included. Furthermore, the surface-modified ND may also contain one type or more of other surface functional groups (e.g. an amino group, a hydroxy group, and a carboxyl group) besides the ammonium salt modification group.

As the ND particles, for example, detonation ND (i.e. ND produced by detonation method) and a high temperature and high pressure method ND (i.e. ND produced by a high temperature and high pressure method) can be used. In an embodiment of the present invention, among these, from the viewpoints of making the particle size of the primary particle be in a single-digit nanometer and achieving excellent dispersibility, a detonation ND is preferred.

The detonation ND includes air-cooling detonation ND (i.e. ND produced by an air-cooling detonation method) and water-cooling detonation ND (i.e. ND produced by a water-cooling detonation method). In an embodiment of the present invention, among these, from the viewpoints of preparing smaller primary particles compared to those of water-cooling detonation ND and, especially, achieving excellent dispersibility, air-cooling detonation ND is preferred.

The particle size (D50) of the surface-modified NDs according to an embodiment of the present invention is, for example, 200 nm or smaller, preferably 170 nm or smaller, more preferably 160 nm or smaller, and even more preferably 150 nm or smaller. The lower limit of the particle size (D50) of the surface-modified NDs is, for example, 20 nm. Furthermore, the particle size (D90) is, for example, 200 nm or smaller, preferably 180 nm or smaller, and more preferably 170 nm or smaller. The lower limit of the particle size (D90) of the surface-modified NDs is, for example, 50 nm. A smaller particle size of the surface-modified ND is preferred from the viewpoints of achieving excellent dispersibility and achieving high transparency of the composite material described below. The (average) particle size of the surface-modified ND can be measured using a dynamic light scattering method.

In the surface-modified ND according to an embodiment of the present invention, the ammonium salt modification group derived from the quaternary ammonium compound described above modifies the hydrophilic surface of the ND particle. The surface-modified ND according to an embodiment of the present invention having the surface modification group exhibits excellent aggregation resistance in an organic solvent (especially, in a hydrophobic organic solvent) and the aggregation of ND particles is suppressed by the steric hindrance of the surface modification group, compared to the case of ND particles having no surface modification groups. Thus, the surface-modified ND can exhibit excellent dispersibility.

Furthermore, the ammonium salt modification group has excellent affinity toward an organic solvent and a resin. Therefore, when the surface-modified ND according to an embodiment of the present invention is included in an organic solvent or in a resin, excellent dispersibility can be exhibited.

Furthermore, the ammonium salt modification group has excellent thermal stability (that is, excellent heat resistance). Therefore, the surface-modified ND according to an embodiment of the present invention does not lose the surface modification group by decomposition or elimination even in a high temperature environment, and thus maintains aggregation resistance, and maintains excellent dispersibility in an organic solvent or in a resin.

The thermal decomposition starting temperature of the surface-modified ND according to an embodiment of the present invention is, for example, 250° C. or higher, preferably 280° C. or higher, and more preferably 300° C. or higher. The upper limit of the thermal decomposition starting temperature is, for example, approximately 500° C., preferably 450° C., and particularly preferably 400° C. Note that, in an embodiment of the present invention, the thermal decomposition starting temperature is a temperature that is attributed to thermal decomposition of the ND particles and the surface modification group and is determined by subjecting powder of the surface-modified ND to thermo gravimetric-differential thermal analysis (TG-DTA) at a temperature increase rate of 20° C./min in an air atmosphere.

As described above, because the surface-modified ND according to an embodiment of the present invention has excellent aggregation resistance and can maintain the aggregation resistance even in a high-temperature environment of 200° C. or higher, the surface-modified ND can be uniformly blended in a thermoplastic resin having a high molding temperature (or melting temperature), such as engineering plastic (including general engineering plastic and super engineering plastic) in addition to heat- or photo-curable resins and general engineering plastics, and the characteristics of the ND can be imparted to a thermoplastic resin having a high molding temperature.

Nanodiamond Liquid Dispersion

The nanodiamond liquid dispersion (ND liquid dispersion) according to an embodiment of the present invention contains an organic solvent and the surface-modified nanodiamond described above, and includes the surface-modified nanodiamond in a proportion of 0.0001 to 10 parts by mass per 100 parts by mass of the organic solvent.

The organic solvent is a dispersion medium for dispersing the surface-modified NDs. Examples thereof include aromatic hydrocarbons, such as benzene, toluene, and xylene; alicyclic hydrocarbons, such as cyclohexane and methylcyclohexane; amides (or aprotic polar solvent), such as dimethylformamide (DMF), dimethylacetamide, and N-methylpyrrolidone; sulfoxide (or aprotic polar solvent), such as dimethyl sulfoxide; halogenated hydrocarbons, such as chloroform, dichloromethane, dichloroethane, carbon tetrachloride, chlorobenzene, and trifluoromethylbenzene; linear or cyclic ethers, such as diethyl ether, diisopropyl ether, dimethoxyethane, tetrahydrofuran, and dioxane; esters, such as ethyl acetate and butyl acetate; and lubricating oils, such as poly-α-olefin, polyoxyethylene, and polyvinyl ether. One of these solvents can be used alone or two or more in combination.

The concentration (solid content concentration) of the surface-modified NDs in the ND liquid dispersion is, for example, from 0.0001 to 10 mass %.

Therefore, the content of the dispersion medium in the ND liquid dispersion is, for example, from 90 to 99.9999 mass %, and the content of the organic solvent in the dispersion medium is, for example, 50 mass % or greater, preferably 80 mass % or greater, and particularly preferably 90 mass % or greater. Note that the upper limit is 100 mass %.

Furthermore, the ND liquid dispersion according to an embodiment of the present invention may include one type or two or more types of other components besides the surface-modified NDs and the organic solvent described above. The content of such other components (in the case where two or more types are included, a total amount thereof) is, for example, 30 mass % or less, preferably 20 mass % or less, particularly preferably 10 mass % or less, most preferably 5 mass % or less, and especially preferably 1 mass % or less, based on the total amount of the ND liquid dispersion. Note that the lower limit is 0 mass %. Therefore, the total content of the surface-modified NDs and the organic solvent described above is, for example, 70 mass % or greater, preferably 80 mass % or greater, particularly preferably 90 mass % or greater, most preferably 95 mass % or greater, and most preferably 99 mass % or greater, based on the total amount of the ND liquid dispersion.

The ND liquid dispersion according to an embodiment of the present invention includes the surface-modified NDs in a highly dispersed state. Furthermore, excellent heat resistance is achieved, the NDs do not aggregate even in a high-temperature environment of 200° C. or higher, and a highly dispersed state can be maintained. Thus, the ND liquid dispersion according to an embodiment of the present invention can be suitably used as, for example, an imparting agent to impart the characteristics of the nanodiamond (e.g. high mechanical strength, high refractive index, and high thermal conductivity) to a resin (e.g. including thermoplastic resin having a high molding temperature (or melting temperature) such as engineering plastic in addition to heat- or photo-curable resins and general engineering plastics). In addition, the ND liquid dispersion can be also suitably used as an antifriction agent or a lubricant applied to a sliding member or the like of a machine component (e.g. automobiles, aircrafts, and the like).

Method of Producing Surface-modified Nanodiamond and Nanodiamond Liquid Dispersion The nanodiamond liquid dispersion according to an embodiment of the present invention can be produced by, for example, forming ND particles by a detonation method and reacting the formed ND particles and a quaternary ammonium compound in an organic solvent.

The detonation method includes an air-cooling detonation method and a water-cooling detonation method. In an embodiment of the present invention, among these, the air-cooling detonation method is preferred than the water-cooling detonation method from the viewpoint of obtaining ND having smaller primary particles.

Furthermore, the detonation can be performed in an air atmosphere or may be performed in an inert gas atmosphere, such as a nitrogen atmosphere, an argon atmosphere, or a carbon dioxide atmosphere.

An example of the method for manufacturing the surface-modified ND according to embodiments of the present invention is described below; however, the surface-modified ND according to an embodiment of the present invention is not limited to those formed by the following manufacturing method.

Formation

In the case where the ND is produced by the air-cooling detonation method in an inert gas atmosphere, first, an electric detonator is attached to a molded explosive and then this is placed inside a pressure-resistant vessel for detonation. The vessel is sealed in a state in which a gas having the atmospheric composition under normal pressure and the explosive to be used coexist inside the vessel. The vessel is, for example, made of iron, and the volume of the vessel is, for example, from 0.5 to 40 $m^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce NDs by the action of the pressure and energy of the shock waves that are produced in the explosion. Due to Coulomb interaction between crystal planes, in addition to van der Waals forces between adjacent primary particles or crystallites, the produced NDs aggregate very firmly to form agglutinates.

In the formation, next, for example, the vessel and its interior are left to stand for approximately 24 hours at room temperature, and are thereby allowed to be cooled. After the cooling, the ND crude product (containing the agglutinate of the ND particles formed as described above and soot), which adheres to the inner wall of the vessel, is scraped off with a spatula, and the ND crude product is thereby collected. Crude product of ND particles can be prepared by the method described above.

Acid-Treating

The acid treatment is a process that allows a strong acid to act on the ND crude product, which is a raw material, for example, in an aqueous solvent to remove the metal oxide. The ND crude product formed by the detonation method is prone to inclusion of a metal oxide, and the metal oxide is an oxide of Fe, Co, Ni, or the like resulting from the vessel or the like used in the detonation method. The metal oxide can be dissolved and removed from the ND crude product by allowing a predetermined strong acid to act thereon in an aqueous solvent, for example. The strong acid used in the acid treatment is preferably a mineral acid, and examples thereof include hydrochloric acid, hydrofluoric acid, sulfuric acid, nitric acid, and mixtures thereof (i.e. mixed acid). The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such acid treatment, the solid content (including ND agglutinate) is preferably washed with water through decantation for example, until the pH of the precipitate liquid becomes 2 to 3. If the content of the metal oxide in the ND crude product formed by the detonation method is small, the acid treatment such as that described above may be omitted.

Oxidation Treatment

The oxidation treatment is a process to remove graphite from the ND crude product using an oxidizing agent. The ND crude product formed by the detonation method includes graphite, and this graphite is derived from carbon that did not form ND crystals, among the carbons released by partially incomplete combustion of the explosive used. For example, the graphite can be removed from the ND crude product by allowing a predetermined oxidizing agent to act thereon in an aqueous solvent after the acid treatment described above. Furthermore, an oxidizing agent can be allowed to act on the nanodiamond crude product, whereby an oxygen-containing group, such as a carboxyl group or a hydroxyl group, can be introduced to surfaces of the nanodiamonds.

Examples of the oxidizing agent used in the oxidation treatment include chromic acid, chromic anhydride, dichromic acid, permanganic acid, perchloric acid, nitric acid, mixed acids (mixtures of sulfuric acid and nitric acid), and salts of these compounds. In an embodiment of the present invention, among these, use of a mixed acid (a mixture of sulfuric acid and nitric acid) is preferred from the viewpoint of excellent action of oxidizing and removing the graphite.

The mixture ratio of sulfuric acid to nitric acid (the former/the latter, mass ratio) in the above-described mixed acid is preferably, for example, from 60/40 to 95/5, since when the mixture ratio is in that range, it is possible to efficiently oxidize and remove graphite at, for example, a temperature of 130° C. or higher (particularly preferably 150° C. or higher, and the upper limit being 200° C., for example), even under approximately atmospheric pressure (for example, 0.5 to 2 atm). The lower limit is preferably 65/35, and particularly preferably 70/30. Furthermore, the upper limit is preferably 90/10, particularly preferably 85/15, and most preferably 80/20.

With the ratio of nitric acid in the mixed acid greater than the above range, the content of sulfuric acid, which has a high boiling point, would decrease, thus the reaction temperature at or near normal pressure would be lowered to, for example, not higher than 120° C., and the removal efficiency for the graphite may decrease. On the other hand, with the ratio of nitric acid in the mixed acid less than the above range, the content of nitric acid, which greatly contributes to the oxidation of the graphite, would decrease, and thus the removal efficiency for the graphite may decrease.

The amount of the oxidizing agent (especially, the mixed acid) used is, for example, from 10 to 50 parts by mass, preferably from 15 to 40 parts by mass, and particularly preferably from 20 to 40 parts by mass, relative to 1 part by mass of the ND crude product. Furthermore, the amount of the sulfuric acid used in the mixed acid is, for example, from 5 to 48 parts by mass, preferably from 10 to 35 parts by mass, and particularly preferably from 15 to 30 parts by mass, relative to 1 part by mass of the ND crude product. The amount of the nitric acid used in the mixed acid is, for example, from 2 to 20 parts by mass, preferably from 4 to 10 parts by mass, and particularly preferably from 5 to 8 parts by mass, relative to 1 part by mass of the ND crude product.

Furthermore, when the mixed acid is used as the oxidizing agent, a catalyst may be used together with the mixed acid. The use of a catalyst can further enhance the efficiency of graphite removal. Examples of the catalyst include copper (II) carbonate. The amount of the catalyst used is, for example, approximately from 0.01 to 10 parts by mass per 100 parts by mass of the ND crude product.

The oxidation treatment temperature is, for example, from 100 to 200° C. The duration of the oxidation treatment is, for example, from 1 to 24 hours. The oxidation treatment can be performed under reduced pressure, under atmospheric pressure, or under increased pressure.

Aging

After completion of the oxidation treatment, aging may be performed. In particular, in the case where a mixed acid is used as an oxidizing agent, the aging treatment is preferably performed after water is added to reduce the sulfuric acid concentration in the reactor. The aging temperature is, for example, approximately from 130 to 180° C., and the aging time is, for example, approximately from 1 to 10 hours.

Drying Step

In the present method, next, drying is preferably performed. In this process, for example, the liquid is evaporated from a solution prepared by the process described above using an evaporator, and then the resulting residual solid is dried by heating and drying in a vacuum oven for drying. The temperature for heat drying is, for example, from 20 to 150° C. Through such drying, the ND agglutinates (agglutinates of the ND particles) can be formed as powder.

Oxygen Oxidation

In the present method, next, oxygen oxidation is preferably performed. The oxygen oxidation is a process to oxidize the surface of the ND formed through the process described above to form an oxygen-containing group. The oxidization with oxygen is preferably performed in an oxygen atmosphere or in an oxygen atmosphere diluted with nitrogen (for example, heat treatment at a temperature from 300 to 400° C. for approximately 1 to 5 hours).

Modification

Modification is preferably performed next. The modification is a process in which a quaternary ammonium compound is reacted with the ND formed through the process described above thereby imparting a surface modification group to ND particles. When the quaternary ammonium compound described above is reacted with the ND, a carboxyl group present on the surface of the ND undergoes a neutralization reaction with the quaternary ammonium compound to form a salt.

Examples of the quaternary ammonium compound include compounds represented by Formula (2) below. In the following formula, $R^1$, $R^2$, $R^3$, and $R^4$ are the same as those described above. X represents a halogen atom.

[Chem. 3]

The used amount of the quaternary ammonium compound is, for example, approximately from 2 to 10 parts by mass per 100 parts by mass of the NDs. Furthermore, the reaction temperature is, for example, from 0 to 50° C., and the reaction time is, for example, from 0.5 to 10 hours.

In the modification, preferably, the powder of ND agglutinates formed through the drying, the quaternary ammonium compound, and an organic solvent are added in a reaction vessel to prepare a mixed solution, the mixed solution is agitated, and then a neutralization reaction with the quaternary ammonium compound proceeds while the ND agglutinates are disintegrated or dispersed.

The method of disintegrating or dispersing the ND agglutinates is not particularly limited, and a known and common methods (e.g. methods of treatment using a high shearing mixer, a high shear mixer, a homomixer, a ball mill, a bead mill, a high pressure homogenizer, an ultrasonic homogenizer, or a colloid mill) can be employed. In an embodiment of the present invention, among these, ultrasonic treatment using an ultrasonic homogenizer in a state where beads (e.g. zirconia beads) have been added (e.g. in a mixed solution in a reaction vessel, zirconia beads or the like are added as a disintegration medium, and then the mixed solution is agitated by using an ultrasonic generator) is preferred. This is because: the ultrasonic treatment generates cavitation (microbubbles), which, upon its collapse, creates jet flow that provides a remarkably huge kinetic energy to the beads in the mixed solution; the beads provide impact energy to the ND agglutinates in the mixed solution and the ND agglutinates can be disintegrated or dispersed to primary particles; and the surface modification can be provided not only to the surfaces of the ND agglutinates, but also the surfaces of the primary particles released from the ND agglutinates. And thus surface-modified NDs having superior dispersibility can be obtained.

Examples of the organic solvent include aromatic hydrocarbons, such as benzene, toluene, and xylene; alicyclic hydrocarbons, such as cyclohexane and methylcyclohexane; amides (or aprotic polar solvent), such as dimethylformamide (DMF), dimethylacetamide, and N-methylpyrrolidone; sulfoxide (or aprotic polar solvent), such as dimethyl sulfoxide; halogenated hydrocarbons, such as chloroform, dichloromethane, dichloroethane, carbon tetrachloride, chlorobenzene, and trifluoromethylbenzene; linear or cyclic ethers, such as diethyl ether, diisopropyl ether, dimethoxyethane, tetrahydrofuran, and dioxane; esters, such as ethyl acetate and butyl acetate; and lubricating oils, such as poly-α-olefin, polyoxyethylene, and polyvinyl ether. One of these solvents can be used alone or two or more in combination.

The used amount of the organic solvent is in a range that the ND concentration is, for example, from 0.01 to 10 mass %.

After completion of the neutralization reaction of the ND and the quaternary ammonium compound, the reaction product is preferably repeatedly subjected to washing by an organic solvent and centrifugal separation.

By undergoing the modification described above, an ND liquid dispersion in which the surface-modified NDs are dispersed in the organic solvent can be obtained. The ND liquid dispersion preferably contains primary particles of the nanodiamond. In addition, a secondary particle in which a few to dozens of the primary particles aggregate may be included. Furthermore, by drying the ND liquid dispersion, the surface-modified ND as powder can be obtained.

The particle size (D50) of the surface-modified NDs in the ND liquid dispersion formed as described above is, for example, 200 nm or smaller, preferably 170 nm or smaller, more preferably 160 nm or smaller, even more preferably 150 nm or smaller, and particularly preferably 120 nm or smaller. The lower limit of the particle size (D50) of the surface-modified NDs is, for example, 20 nm. Furthermore, the particle size (D90) is, for example, 200 nm or smaller, preferably 180 nm or smaller, and more preferably 170 nm or smaller. The lower limit of the particle size (D90) of the surface-modified NDs is, for example, 50 nm. A smaller particle size of the surface-modified ND is preferred from the viewpoint of achieving high transparency of the composite material described below.

Composite Material

The composite material of an embodiment of the present invention contains a resin and the surface-modified NDs described above. The surface-modified NDs are preferably included in a state in which the surface-modified NDs are dispersed in the resin (particularly in a state in which the surface-modified NDs are highly dispersed in the resin).

The resin includes thermoplastic resins and cured products (or polymers) of heat- or photo-curable resins. Furthermore, the thermoplastic resin includes crystalline resins and amorphous resins. One of these solvents can be used alone or two or more in combination.

In the case where the heat or photo-curable resin is used as the resin, a composite material can be formed by mixing the heat- or photo-curable resin with the surface-modified NDs or the ND liquid dispersion described above, and then curing (or polymerizing) the heat- or photo-curable resin by heat treatment or photoirradiation treatment.

In the case where the thermoplastic resin is used as the resin, the surface-modified NDs or the ND liquid dispersion described above is blended with the thermoplastic resin in a heat-melted state, then the blend is cooled and solidified, and thus a composite material can be formed. In an embodiment of the present invention, the surface-modified NDs having excellent heat resistance are used as described above, therefore dispersibility of the NDs are not lost even in a thermoplastic resin that has been heated and melted.

The composite material according to an embodiment of the present invention is preferably a molten mixture of a thermoplastic resin and the surface-modified nanodiamond prepared by heating and melting the thermoplastic resin at a temperature that is not lower than the glass transition temperature or the melting point of the resin, adding the surface-modified NDs or the ND liquid dispersion described above, and kneading.

Examples of the thermoplastic resin include resins (e.g. amorphous resins) having a glass transition temperature of, for example, 150° C. or higher (e.g. from 150° C. to 350° C.), and preferably 200° C. or higher (e.g. from 200° C. to 350° C.), and resins (e.g. crystalline resins) having a melting point of, for example, 150° C. or higher (e.g. from 150° C. to 350° C.), and preferably 200° C. or higher (e.g. from 200° C. to 350° C.). The melting temperature of such a thermoplastic resin is, for example, 200° C. or higher, and preferably 250° C. or higher. Note that the upper limit of the melting temperature is, for example, 350° C., and preferably 300° C.

Examples of the thermoplastic resin include plastics, general engineering plastics, and super engineering plastics.

Examples of the plastic include poly-α-olefins, such as polymethylpentene, polybutene, polymethylbutene, and polymethylhexene, and cyclic polyolefins, such as norbornene-based cycloolefin polymers.

Examples of the general engineering plastic include amorphous resins, such as polycarbonate (PC) and modified polyphenylene ether (mPPE); and crystalline resins, such as polyamide 6 (PA6), polyamide 66 (PA66), polyacetal (POM), polybutylene terephthalate (PBT), and polyethylene terephthalate (PET).

Examples of the super engineering plastic include amorphous resins, such as polyarylate (PAR), polysulfone (PSU), polyphenylsulfone (PPSU), polyethersulfone (PES), polyamide-imide (PAI), and polyetherimide (PEI); and crystalline resins, such as polyphenylenesulfide (PPS), polyether ether ketone (PEEK), liquid-crystal polymers (LCP), polyimide (PI), and thermoplastic fluororesins.

Specific examples of the thermoplastic fluororesin include polytetrafluoroethylene (PTFE), perfluoroalkoxy alkane (PFA), perfluoroethylene propene copolymers (FEP), ethylene-tetrafluoroethylene copolymers (ETFE), tetrafluoroethylene-perfluorodioxol (TEE/PDD), polyvinylidene fluoride (PVDF), polychlorotrifluoroethylene (PCTFE), ethylene-chlorotrifluoroethylene copolymers (ECTFE), and polyvinyl fluoride (PVF). One of these solvents can be used alone or two or more in combination.

The melt flow rate (MFR, unit: g/10 min) of the thermoplastic resin is, for example, from 1 to 100, preferably from 5 to 50, and particularly preferably from 10 to 40. Note that the melt flow rate in the present specification is a mass (g) of a resin flowing out from an orifice having a diameter of 2 mm and a length of 8 mm in 10 minutes measured in accordance with ASTM D 3159-10 at a temperature of 297° C. and a load of 49 N.

The content of the surface-modified NDs in the composite material of an embodiment of the present invention is not particularly limited and is, for example, from approximately 10 to 0.0001 mass %, and preferably from 1 to 0.001 mass %, based on the amount of the resin (preferably thermoplastic resin).

In addition to the resin and the surface-modified ND, the composite material according to an embodiment of the present invention can contain various additives as necessary provided that they do not impair the effects of the present invention. Examples of the additive include flame retardants, stabilizers, ultraviolet absorbers, photostabilizers, antistatic agents, conductivity imparting agents, lubricants, fillers, dispersing agents, releasing agents, foaming agents, coloring agents, various inorganic substances (silica, metal fine particles, and the like), and fillers (nanocarbon materials and the like). The content of these (in the case where two or more types are included, the total amount thereof) is, for example, 30 mass % or less, preferably 20 mass % or less, particularly preferably 10 mass % or less, and most preferably 5 mass % or less, relative to the total amount of the composite material. Thus, the proportion of the total mass of the resin (preferably thermoplastic resin) and the surface-modified NDs is, for example, 70 mass % or greater, preferably 80 mass % or greater, particularly preferably 90 mass % or greater, and most preferably 95 mass % or greater, relative to the total amount of the composite material. Note that the upper limit is 100 mass %.

The composite material according to an embodiment of the present invention contains the surface-modified NDs having excellent dispersibility, and thus NDs (including surface-modified NDs) are included in a highly dispersed and uniform state. In the case where a transparent resin is used, the transparency of the resin is not impaired and is maintained even in the resulting composite material.

The average particle size (D50, median diameter) of the surface-modified NDs in the composite material according to an embodiment of the present invention is, for example, 2000 nm or smaller, preferably 500 nm or smaller, more preferably 200 nm or smaller, and even more preferably 50 nm or smaller. The lower limit of the average particle size of the ND particles is, for example, 1 nm. The average particle size of the surface-modified NDs is determined by capturing an electron microscope image of a sufficient number (for example, 100 or more, preferably 300 or more; particularly 100 particles, 300 particles, or the like) of the surface-modified NDs using an electron microscope (SEM, TEM), measuring the particle sizes of these surface-modified NDs, and determining arithmetic mean thereof.

The composite material according to an embodiment of the present invention has a higher degree of crystallinity compared to that of the case where no surface-modified NDs are included, and can exhibits superior characteristics in terms of mechanical strength.

The composite material of an embodiment of the present invention can be suitably used, as crystalline melt molding resins, for a material for forming various articles to which characteristics of the ND (e.g. high mechanical strength, high refractive index, high thermal conductivity, and heat resistance-imparting action) are desirably imparted. Such articles include, for example, functional hybrid materials, thermally functional materials (heat resistant, heat storing, heat conductive, and heat insulating materials, and the like), photonics materials (organic EL elements, LEDs, liquid crystal displays, optical disks, and the like), bio/biocompatible materials, catalysts, coating materials, polishing materials, films (e.g. hard coating films for touchscreen, various displays, and the like, thermal barrier films), sheets, screens (e.g. transmission type transparent screens), fillers (e.g. fillers for heat radiation or for enhancing mechanical strength), thermal stabilizers, and heat resistant plastic substrate materials (for flexible displays).

EXAMPLES

Hereinafter, the present invention will be described more specifically with reference to examples, but the present invention is not limited by these examples. Note that the values in Examples and Comparative Examples were measured by the following methods.

Solid Content Concentration

The solid content concentration in the ND liquid dispersion was calculated based on a weighed value of a liquid dispersion weighed to be from 3 to 5 g, and a weighed value of a dried product (powder) remained after a dispersion medium was vaporized from the weighed liquid dispersion by heating, weighed by precision balance.

Example 1: Preparation of Surface-Modified ND Liquid Dispersion and Surface-Modified ND Powder The surface-modified ND liquid dispersion and the surface-modified ND powder were produced by the following processes.

Formation

First, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of trinitrotoluene (TNT) and hexogen (RDX) was used. The mass ratio of TNT and RDX (TNT/RDX) in the explosive was 50/50. Next, the electric detonator was triggered, and the explosive was detonated in the vessel. Then the temperatures of the vessel and the inside of the vessel were decreased by allowing the vessel to stand at room temperature for 24 hours. After this cooling, the ND crude product (containing agglutinates of the nanodiamond particles formed by the detonation method described above and soot) deposited on the inner wall of the vessel was collected by scraping with a spatula.

Acid-Treating

Then, 6 L of 10 mass % hydrochloric acid was added to 200 g of the recovered ND crude product to prepare a slurry, and the slurry was subjected to a heating treatment for 1 hour under reflux at the normal pressure condition. The heating temperature in this acid treatment was from 85 to 100° C. Next, after cooling, the solid (containing the ND agglutinates and soot) was washed with water by decantation. The solid was repeatedly washed with water by decantation until the pH of the precipitation solution reached 2 from the low pH side.

Oxidation Treatment

Then, 6 L of a 98 mass % aqueous sulfuric acid solution and 1 L of a 69 mass % aqueous nitric acid solution were added to the precipitate liquid (including ND agglutinates) prepared through decantation to prepare a slurry, and subsequently, the slurry was heated under reflux for 48 hours at the normal pressure condition. The heating temperature in this oxidation treatment was from 140 to 160° C.

Aging

After the completion of the reaction in the oxidation treatment, while the temperature in the reactor was maintained at 150° C., the sulfuric acid concentration in the reactor was adjusted to 73 mass % by adding water and allowed to stand still for 5 hours. Then, after the temperature in the reactor was cooled to room temperature, the solid content (including ND agglutinates) was washed with water by decantation. The solid was washed repeatedly with water by decantation until the supernatant, that had been colored at the beginning of water washing, became visually transparent.

Oxygen Oxidation

The oxygen oxidation treatment was then performed using a gas atmosphere furnace (trade name "Gas Atmosphere Tube Furnace KTF045N1", available from Koyo Thermo Systems Co., Ltd.). Specifically, 4.5 g of the ND powder formed as described above was placed inside a furnace core tube of the gas atmosphere furnace, and nitrogen gas was continuously passed through the furnace core tube at a flow rate of 1 L/minute for 30 minutes. Then, the flowing gas was switched from nitrogen to a mixed gas of oxygen and nitrogen, and the mixed gas was continuously passed through the furnace core tube at a flow rate of 1 L/minute. The oxygen concentration in the mixed gas was 4 vol. %. After switching to the mixed gas, the temperature inside the furnace was raised to a temperature set for heating of 350° C. The temperature was raised at a rate of 10° C./min to 330° C., which was a temperature 20° C. lower than the temperature set for heating, and then at a rate of 1° C./min from 330° C. to the temperature set for heating of 350° C. Then, the oxygen oxidation treatment was carried out on the ND powder in the furnace while the temperature condition inside the furnace was maintained at 350° C. The duration of the treatment was 3 hours. The ND powder was produced as described above.

Modification

The modification was then performed. Specifically, in an ultrasonic homogenizer, the ND powder (20 mg), toluene (20 mL), dimethyldistearylammonium bromide (40 mg) as the quaternary ammonium compound, and 35 g of zirconia beads having a particle size of 50 μm were charged, and ultrasonic homonization was performed for 4 hours while the temperature was maintained at the room temperature. Then, washing with toluene and hexane and centrifugal separation were repeatedly performed.

By the modification as described above, a toluene solution in which the surface-modified nanodiamonds having a structure modified with the group represented by Formula (1-1) below were dispersed (i.e. ND liquid dispersion (1), ND concentration: 0.2 mass %) was obtained.

[Chem. 4]

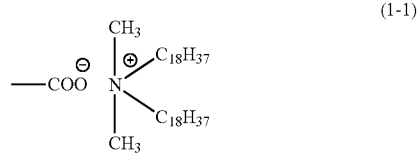

(1-1)

The particle size distribution of the NDs in the ND liquid dispersion (1) formed as described above was measured by dynamic light scattering method. Specifically, the particle size distribution of the NDs was measured by dynamic light scattering method (non-contact backscattering method) using an instrument (trade name "Zetasizer Nano ZS") available from Malvern Panalytical Ltd. As a result of the measurement, the particle size D50 (median diameter) of the NDs was 31 nm, and the particle size D90 was 64 nm.

Figure 2:
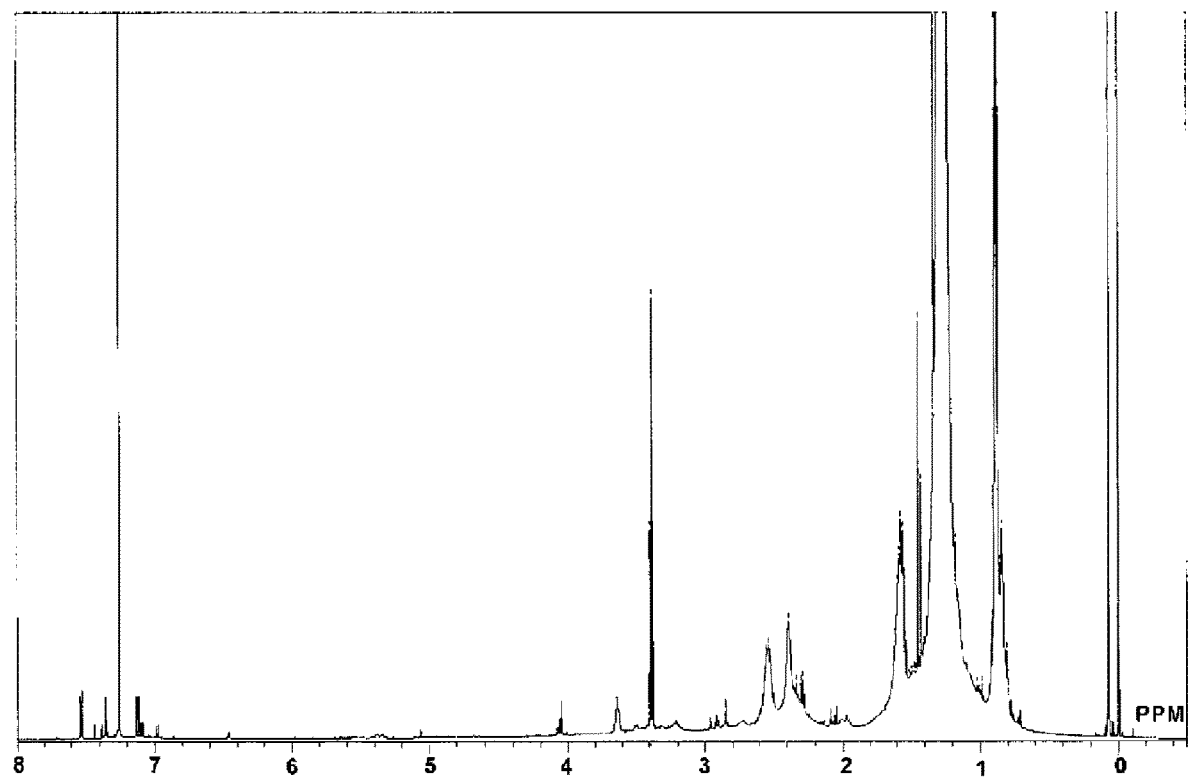
FIG. 2 is a figure showing $^1$H-NMR analysis result (0 to 8 ppm) of a surface-modified nanodiamond produced in Example 1.
Figure 3:
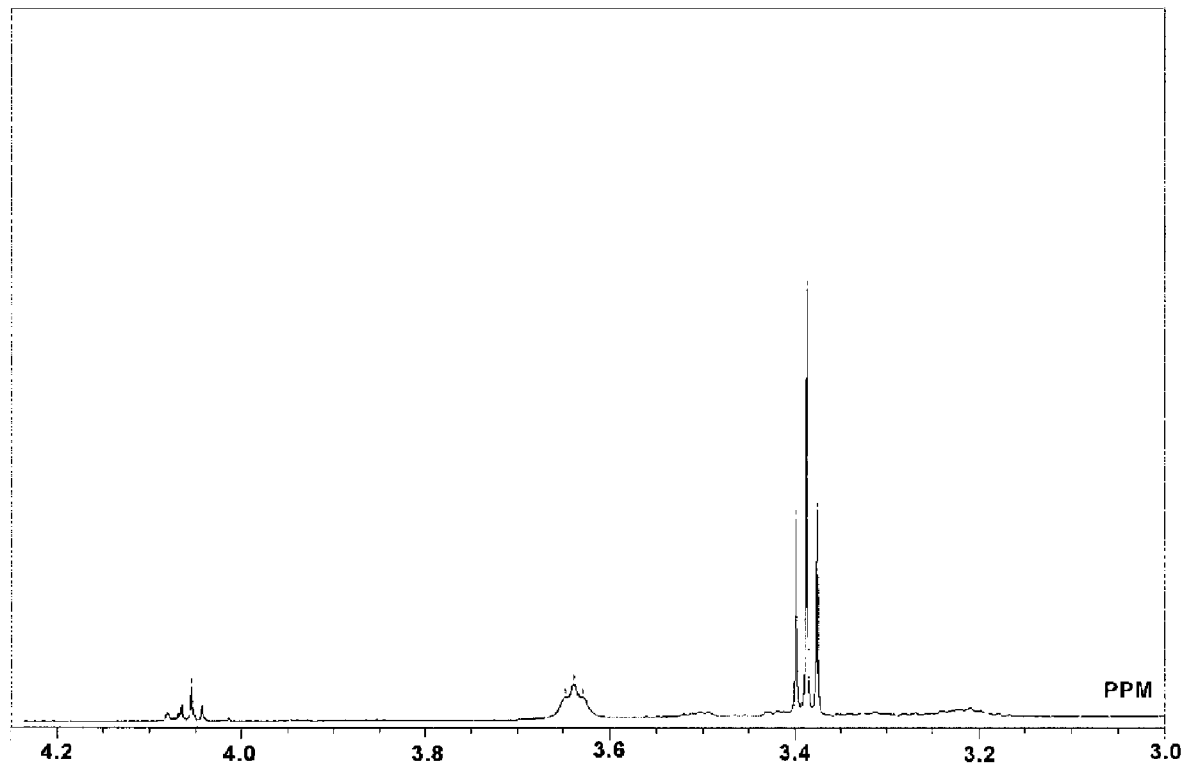
FIG. 3 is a figure showing $^1$H-NMR analysis result (3 to 4.25 ppm) of a surface-modified nanodiamond produced in Example 1.

After the liquid was evaporated from the ND liquid dispersion (1) formed as described above using an evaporator, the resulting residual solid was dried in a vacuum oven for drying at room temperature. By this, a surface-modified ND powder (1) was obtained. The thermal decomposition starting temperature of the prepared surface-modified ND powder (1) was measured by using a thermo gravimetric-differential thermal analyzer (trade name "TG/DTA 6300", available from Hitachi High-Tech Science Corporation) in an air atmosphere and at a temperature increase rate of 20° C./min, and the thermal decomposition starting temperature was 305° C. Furthermore, as a result of subjecting the surface-modified ND powder (1) to $^1$H-NMR analysis in the following conditions, two types of peaks derived from methylene $^1$H at amine α-position were confirmed around 3.4 ppm and around 3.6 ppm, and it was thus confirmed that the dimethyldistearylammonium ions were bonded and coordinated on the ND surface (see FIGS. 2 and 3).

$^1$H-NMR analysis conditions

Instrument: 270 MHz NMR analyzer, available from JEOL Ltd.

Sample concentration: 95% (w/w)

Solvent: $CDCl_3$

Internal standard: TMS

In a melt-kneading machine (LABO PLASTOMILL, available from Toyo Seiki Seisaku-sho, Ltd.), the temperature of which had been increased to 250° C., 0.03 g (amount that was 0.1 mass % relative to the amount of ETFE described below) of the surface-modified ND powder (1) and 30 g of ethylene-tetrafluoroethylene copolymer (ETFE) (trade name "Fluon", grade name: LM-730AP, available from AGC Inc., melting point: 225° C., MFR: 20 to 30 g/10 min) were kneaded for 5 minutes and then cooled to room temperature, and thus a composite material (1) of the ETFE and the surface-modified ND (1) was produced.

When the cross section of the produced composite material (1) was observed by a TEM image, primary particles of the ND particles and secondary particles formed by aggregation of approximately a dozen primary particles coexisted and were dispersed, and the average particle size was approximately a few tens of nm. That is, the surface-modified NDs (1) were highly dispersed.

Example 2

A toluene solution in which the surface-modified nanodiamonds having a structure modified with the group represented by Formula (1-2) below were dispersed (i.e. ND liquid dispersion (2), ND concentration: 0.2 mass %) was formed in the same manner as in Example 1 except that trimethylstearylammonium bromide (200 mg) was used in place of the dimethyldistearylammonium bromide as the quaternary ammonium compound and ultrasonic homonization was performed for 6 hours.

[Chem. 5]

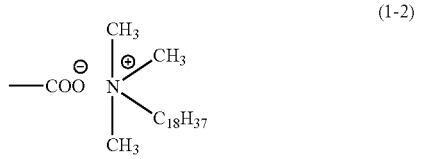

(1-2)

The particle size D50 (median diameter) of the NDs in the ND liquid dispersion (2) formed as described above was 2 μm. Furthermore, the thermal decomposition starting temperature of the ND was 248° C.

Example 3

A toluene solution in which the surface-modified nanodiamonds having a structure modified with the group represented by Formula (1-3) below were dispersed (i.e. ND liquid dispersion (3), ND concentration: 0.2 mass %) was formed in the same manner as in Example 1 except that tetrastearylammonium bromide (120 mg) was used in place of the dimethyldistearylammonium bromide as the quaternary ammonium compound and ultrasonic homonization was performed for 6 hours.

[Chem. 6]

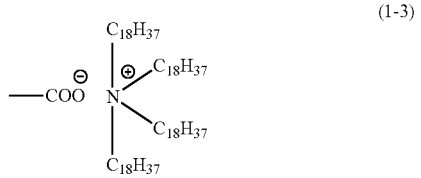

(1-3)

Comparative Example 1

An ND powder (hereinafter, also referred to as "surface-unmodified ND powder") was formed in the same manner as in Example 1 up to the oxygen oxidation. The thermal decomposition starting temperature of the prepared surface-unmodified ND powder was 190° C. Furthermore, the prepared surface-unmodified ND powder was not dispersed in toluene, and aggregated and precipitated.

A composite material (2) of the ETFE and the surface-unmodified NDs was produced in the same manner as in Example 1 except that the surface-unmodified ND powder was used in place of the surface-modified ND powder (1).

When the cross section of the produced composite material (2) was observed by a TEM image, the surface-unmodified NDs were dispersed as aggregated secondary particles having large sizes, and the average particle size was approximately several μm.

To summarize the above, configurations and variations according to an embodiment of the present invention will be described below.

[1] A surface-modified nanodiamond having a structure in which a surface of a nanodiamond particle is modified by a group represented by Formula (1).

In the formula, $R^1$ to $R^4$ may be the same or different and each represent an aliphatic hydrocarbon group having from 1 to 25 carbons. Note that at least one of $R^1$ to $R^4$ is an aliphatic hydrocarbon group having from 10 to 25 carbons. Furthermore, an atomic bond of the carbon atom in the formula bonds to the surface of the nanodiamond particle.

[2] The surface-modified nanodiamond according to [1], where two or three groups selected from $R^1$ to $R^4$ are each an aliphatic hydrocarbon group having from 10 to 25 carbons, and the other group(s) are each an aliphatic hydrocarbon group having from 1 to 9 carbons.

[3] The surface-modified nanodiamond according to [1], where $R^1$ is an aliphatic hydrocarbon group having from 10 to 25 carbons, and $R^2$, $R^3$, and $R^4$ are each an aliphatic hydrocarbon group having from 1 to 9 carbons.

[4] The surface-modified nanodiamond according to [1], where two groups selected from $R^1$ to $R^4$ are each an aliphatic hydrocarbon group having from 10 to 25 carbons, and the other two groups are each an aliphatic hydrocarbon group having from 1 to 9 carbons.

[5] The surface-modified nanodiamond according to [1], where $R^1$ and $R^2$ are each an aliphatic hydrocarbon group having from 10 to 25 carbons, and $R^3$ and $R^4$ are each an aliphatic hydrocarbon group having from 1 to 9 carbons.

[6] The surface-modified nanodiamond according to [5], where a sum of number of carbons of $R^1$ and $R^2$ is from 20 to 50, and a sum of number of carbons of $R^3$ and $R^4$ is from 2 to 10.

[7] The surface-modified nanodiamond according to [6], where a sum of number of carbons in $R^1$, $R^2$, $R^3$, and $R^4$ is from 22 to 60.

[8] The surface-modified nanodiamond according to any one of [1] to [7], where a particle size (D50) is from 20 to 200 nm.

[9] The surface-modified nanodiamond according to any one of [1] to [8], where a thermal decomposition starting temperature is 250° C. or higher.

[10] A nanodiamond liquid dispersion including an organic solvent and the surface-modified nanodiamond according to any one of [1] to [9], where the nanodiamond liquid dispersion includes the surface-modified nanodiamond in a proportion of 0.0001 to 10 parts by mass per 100 parts by mass of the organic solvent.

[11] A composite material including a resin and the surface-modified nanodiamond according to any one of [1] to [9].

[12] The composite material according to [11], where a content of the surface-modified nanodiamond is from 10 to 0.0001 mass % relative to a content of the resin.

[13] The composite material according to [11] or [12], where the composite material is a molten mixture of a resin and the surface-modified nanodiamond according to any one of [1] to [9].

[14] The composite material according to any one of [11] to [13], where the resin is a thermoplastic resin having a glass transition temperature or a melting point of 150° C. or higher.

[15] A mechanical strength-imparting agent for a resin, the mechanical strength-imparting agent including the surface-modified nanodiamond according to any one of [1] to [9].

[16] A high refractive index-imparting agent for a resin, the high refractive index-imparting agent including the surface-modified nanodiamond according to any one of [1] to [9].

[17] A thermal conductivity-imparting agent for a resin, the thermal conductivity-imparting agent including the surface-modified nanodiamond according to any one of [1] to [9].

[18] An antifriction agent including the surface-modified nanodiamond according to any one of [1] to [9].

[19] A lubricant including the surface-modified nanodiamond according to any one of [1] to [9].

[20] A method for manufacturing a composite material including kneading the surface-modified nanodiamond according to any one of [1] to [9] and a resin at a temperature that is equal to or higher than a glass transition temperature or a melting point of the resin to produce a composite material of these.

INDUSTRIAL APPLICABILITY

The surface-modified nanodiamond according to an embodiment of the present invention is useful as an imparting agent to impart high mechanical strength, high refractive index, and high thermal conductivity of the nanodiamond to a thermoplastic resin having a high molding temperature.

REFERENCE SIGNS LIST

1 Surface-modified nanodiamond
2 Nanodiamond particle
3 Ammonium salt modification group

The invention claimed is:

1. A surface-modified nanodiamond having a structure in which a surface of a nanodiamond particle is modified by a group represented by Formula (1) below:

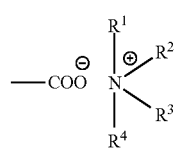

(1)

where $R^1$ to $R^4$ are the same or different and each represent an aliphatic hydrocarbon group having from 1 to 25 carbons, at least one of $R^1$ to $R^4$ is an aliphatic hydrocarbon group having from 10 to 25 carbons, and an atomic bond of the carbon atom in the formula bonds to the surface of the nanodiamond particle,
wherein a particle size, D50, is from 20 to 200 nm.

2. The surface-modified nanodiamond according to claim 1, wherein a thermal decomposition of the surface-modified nanodiamond is a temperature of 250° C. or higher.

3. A nanodiamond liquid dispersion comprising an organic solvent and a surface-modified nanodiamond described in claim 1, wherein the nanodiamond liquid dispersion includes the surface-modified nanodiamond in a proportion from 0.0001 to 10 parts by mass per 100 parts by mass of the organic solvent.

4. A composite material comprising a resin and the surface-modified nanodiamond described in claim 1.

5. The composite material according to claim 4, wherein the composite material is a molten mixture of the resin and the surface-modified nanodiamond.

6. The composite material according to claim 4, wherein the resin is a thermoplastic resin having a glass transition temperature or a melting point of 150° C. or higher.

7. The surface-modified nanodiamond according to claim 1, wherein two or three groups selected from $R^1$ to $R^4$ are each an aliphatic hydrocarbon group having from 10 to 25 carbons, and the other group(s) are each an aliphatic hydrocarbon group having from 1 to 9 carbons.

8. The surface-modified nanodiamond according to claim 1, wherein $R^1$ is an aliphatic hydrocarbon group having from 10 to 25 carbons, and $R^2$, $R^3$, and $R^4$ are each an aliphatic hydrocarbon group having from 1 to 9 carbons.

9. The surface-modified nanodiamond according to claim 1, wherein a sum of number of carbons of $R^1$ and $R^2$ is from 20 to 50, and a sum of number of carbons of $R^3$ and $R^4$ is from 2 to 10.

10. The surface-modified nanodiamond according to claim 1, wherein a sum of number of carbons in $R^1$, $R^2$, $R^3$, and $R^4$ is from 22 to 60.

11. A method for giving a mechanical strength to a resin, the method comprising mixing the surface-modified nanodiamond according to claim 1 with the resin.

12. A method for giving a high refractive index to a resin, the method comprising mixing the surface-modified nanodiamond according to claim 1 with the resin.

13. A method for giving a thermal conductivity to a resin, the method comprising mixing the surface-modified nanodiamond according to claim 1 with the resin.

14. A method for producing an antifriction agent, the method comprising mixing the surface-modified nanodiamond according to claim 1 with the resin.

15. A method for producing a lubricant, the method comprising mixing the surface-modified nanodiamond according to claim 1 with the resin.

16. A method for producing a mechanical strength-imparting agent for a resin, the method comprising mixing the surface-modified nanodiamond according to claim 1 with the resin.

17. A method for producing a high refractive index-imparting agent for a resin, the method comprising mixing the surface-modified nanodiamond according to claim 1 with the resin.

18. A method for producing a thermal conductivity-imparting agent for a resin, the method comprising mixing the surface-modified nanodiamond according to claim 1 with the resin.

19. A method for producing a composite material, the method comprising kneading the surface-modified nanodiamond according to claim 1 and a resin at a temperature that is equal to or higher than a glass transition temperature or a melting point of the resin to produce a composite material of these.

* * * * *